Patented Dec. 29, 1953

2,664,440

UNITED STATES PATENT OFFICE 2,664,440

SEPARATION OF ISOPHTHALIC AND TEREPHTHALIC ACIDS FROM THEIR MIXTURES

William G. Toland, Jr., San Rafael, Calif., assignor to California Research Corporation, San Francisco, Calif., a corporation of Delaware No Drawing. Application October 4, 1952, Serial No. 313,189

11 Claims. (Cl. 260—525)

The present invention concerns the separation of isophthalic and terephthalic acid mixtures. More particularly, the invention relates to a process for separating mixtures of isophthalic acid and terephthalic acid by way of their tertiary amine salts.

The separation of mixtures of isophthalic acid and terephthalic acid presents a serious problem. The acids are very commonly produced in the form of their mixtures by the oxidation of meta- and para-xylene mixtures, since the isomeric xylenes are exceedingly difficult to separate due to the similarity of their physical properties. These crude isophthalic and terephthalic acid mixtures cannot be separated by conventional means, such as fractional distillation, since terephthalic acid has a tendency to sublime and isophthalic acid has such a high melting point that there is always danger of decomposition. More roundabout methods of separating the acids as by first converting them to their ester or salt derivatives have been attempted. Although the isophthalic and terephthalic acid mixtures may be esterified with lower aliphatic alcohols to produce liquid mixtures capable of distillation, the boiling points of the isophthalates and terephthalates are found to be so close that the compounds cannot be effectively separated by fractional distillation. Salts of isophthalic acid and terephthalic acid, like the acids themselves and their ester derivatives, have, in general, high melting points and closely similar physical properties which render them equally difficult to separate. Furthermore, the formation of the salts in such a course of separation has a great disadvantage in the consumption of valuable chemicals as salt-forming reagents.

It has now been found that mixtures of isophthalic acid and terephthalic acid may be separated entirely or into fractions enriched in either acid component by a process which comprises neutralizing the acids with a tertiary amine, forming an aqueous solution of the salts thus obtained, crystallizing a fraction of the dissolved salts from the solution, separating the salt fraction crystallized from the solution, heating said fraction to decompose the salts to their corresponding acids and tertiary amine, and recovering the tertiary amine and acids as decomposition products.

By the process of this invention it is possible to separate mixtures of isophthalic acid and terephthalic acid into essentially pure isophthalic acid and terephthalic acid. The process also may be employed to prepare specific mixtures of isophthalic acid and terephthalic acid enriched in either acid component directly from any crude starting mixtures of the acids.

The present process of separating mixtures of isophthalic acid and terephthalic acid, or producing specific enriched mixtures thereof, has several important advantages over previous methods. The tertiary amine salts of isophthalic acid and the same salts of terephthalic acid are characterized by appreciable differences in physical properties which facilitate their separation. The separated tertiary amine salts of isophthalic acid and terephthalic acid are readily reconverted to the corresponding acids and tertiary amines merely by heating to decompose the salts and drive off the tertiary amine. The tertiary amines, unlike conventional salt-forming reagents, are thus easily recovered in their original form and may be reused indefinitely in the process, thus providing a tremendous saving in operating expense.

In the practice of this invention the crude mixtures of isophathalic acid and terephthalic acid are first neutralized and converted to their tertiary amine salts, as already mentioned. The tertiary amine employed in the neutralization may be any basic tertiary amine capable of forming thermally unstable salts of both the isophthalic acid and the terephthalic acid. Such tertiary amines may be any of the commonly available well-known types. They have the general formula:

in which the substituents $R_1$, $R_2$ and $R_3$ may be aliphatic, aliphaticaryl, aryl, arylaliphatic, or hydroxyaliphatic. Either two or all three of the substituents may be members of a single group as in the case of cycloaliphatic or heterocyclic tertiary amines. Preferably, the tertiary amines boil below about 570° F. Specific examples of such tertiary amines include trimethylamine, N,N-ditolyl-N-benzylamine, N,N-dimethylaniline, triethanolamine, N-methylpiperidine, and pyridine. Pyridine, triethylamine and trimethylamine are presently preferred for their particularly suitable physical characteristics and general availability.

The neutralization of the crude isophthalic acid and terephthalic acid mixtures may be carried out according to any conventional method known to the art. In preferred practice the acid mixtures are reacted with stoichiometric amounts of the tertiary amine in aqueous solution. Sufficient water is employed to entirely dissolve the tertiary amine salts formed. The neutralization may be carried out at any convenient temperature as, for example, at room temperature or about 77° F. Higher temperatures of neutralization not exceeding the boiling point of the tertiary amine may be desirable to entirely dissolve the tertiary amine salts and facilitate their separation by fractional crystallization.

The mixed isophthalic acid and terephthalic acid tertiary amine salts are separated by fractional crystallization based on their different solubilities in water. This may be effected by gradually cooling a concentrated aqueous solution of the salts and collecting the crystalline fractions thus formed. As an alternative method, the aqueous solution of the tertiary amine salts may be concentrated by evaporation of the solvent to form separable crystalline fractions. A combination of the foregoing methods involving both cooling and concentration by evaporation is also a very effective means of separating the salts.

In a preferred embodiment of the invention fractional crystallization to separate the tertiary amine salts of the isophthalic acid and terephthalic acid is induced by adding any inorganic ammonium salt, such as ammonium sulfate, in varying amounts to the aqueous solution and collecting the crystalline fractions thus obtained. This type of fractional crystallization has been found to be remarkably effective. Contrary to what would be expected, the inorganic ammonium salt does not salt out the tertiary amine salts of isophthalic acid and terephthalic acid in equal degree, but acts to selectively crystallize the terephthalic acid salts.

The crystallized fractions formed in the above processes are conveniently separated from the aqueous solutions by way of the commonly known methods for separating solids from liquids. Such methods may involve sedimentation including the use of continuous rotating thickeners and centrifuges. Decantation may also be resorted to if complete separation is not required. For present purposes, filtration with vacuum or centrifuge have been found to be very practical means of separation.

The first crystallized fractions obtained in accordance with the above procedures generally consist of either the tertiary amine salt of terephthalic acid or enriched terephthalic acid tertiary amine salt mixtures with some adherent aqueous salt solution or, in the "salting out" method, some inorganic ammonium salt. In order to obtain essentially pure tertiary amine salt of terephthalic acid, or specific enriched mixtures thereof, further purification by washing the fraction with water is desirable to remove this adherent solution of inorganic ammonium salt. Similar purification procedures are employed with the subsequent crystallized fractions which are successively richer in tertiary amine salt of isophthalic acid.

The tertiary amine salts of isophthalic acid and terephthalic acid and specific enriched mixtures thereof, separated as described above, are easily decomposed by heating the salts to a temperature above the boiling point of the tertiary amine, but not exceeding about 570° F., the temperature at which the acids have a tendency to sublime. The tertiary amines produced in the decomposition are distilled off and recovered by condensation for further use.

In further illustration of the invention, the following simplified example is offered.

10 g. of an 84.5:15.5 isophthalic acid-terephthalic acid mixture were dissolved in 20 cc. of pyridine with heating. 25 cc. of water were then added to the mixture giving a homogeneous solution. 40 cc. of an aqueous 33% ammonium sulfate solution were added. A white precipitate which was formed on the addition of the ammonium sulfate solution was filtered off and dried at about 250° F. to drive off the pyridine. The salt thus obtained was washed with water to remove occluded ammonium sulfate and dried. It weighed 0.3 g. and was shown to be pure terephthalic acid by ultraviolet spectrum analysis.

To the filtrate of soluble isophthalic acid and terephthalic acid pyridine salts obtained above were added 15 cc. more of aqueous 33% ammonium sulfate solution with no further precipitation. 6 g. of solid ammonium sulfate was then added to the filtrate, causing the separation of an organic liquid layer. This organic layer was removed and evaporated to dryness at about 250° F. to decompose the pyridine salts. The resultant acids were washed free of ammonium sulfate with water and dried. They weighed 2.4 g. and on ultraviolet spectrum analysis showed a 93.2:6.8 ratio of isophthalic acid and terephthalic acid.

In the water layer obtained in the last step above were dissolved 2 more grams of solid ammonium sulfate. A precipitate was formed, but no additional organic liquid layer was separated. The precipitate was filtered off and dried at about 250° F. to remove the pyridine. When washed free of salt and dried, it weighed 0.6 g. and upon analysis proved to be an 18.3:71.7 mixture of isophthalic acid and terephthalic acid.

The filtrate obtained above was evaporated to dryness and the pyridine salts thus obtained decomposed upon heating at about 250° F. The acids were washed with hot water to free them of ammonium sulfate and dried. They weighed 5.2 g. and contained a 97:3 ratio of isophthalic acid to terephthalic acid upon analysis.

An additional 0.3 g. of phthalic acids were recovered by cooling the wash water from the last step above. These acids were not analyzed.

The total phthalic acids recovered in the above described process amounted to 9.3 g., or 93% of the initial starting mixture.

I claim:

1. A process for separating mixtures of isophthalic acid and terephthalic acid which comprises neutralizing the acids with a tertiary amine, forming a concentrated aqueous solution of the salts thus obtained, crystallizing a fraction of the dissolved salts from the solution, separating the salt fraction crystallized from the solution, heating said fraction to decompose the salts to their corresponding acids and tertiary amine and recovering the tertiary amine and acids as decomposition products.

2. A process for separating mixtures of isophthalic acid and terephthalic acid which comprises neutralizing the acids with a tertiary amine boiling below about 570° F., forming a concentrated aqueous solution of the salts thus obtained, crystallizing a fraction of the dissolved salts from the solution, separating the salt fraction crystallized from the solution, heating said fraction to decompose the salts to their corresponding acids and tertiary amine and recovering the tertiary amine and acids as decomposition products.

3. A process for separating mixtures of isophthalic acid and terephthalic acid which comprises neutralizing the acids with a tertiary amine boiling below about 570° F., forming a concentrated aqueous solution of the salts thus obtained, crystallizing a fraction of the dissolved salts from the solution by adding an inorganic ammonium salt, separating the salt fraction crystallized from the solution, heating said fraction to decompose the salts to their corresponding acids and amine, and recovering the tertiary amine and acids as decomposition products.

4. A process for separating mixtures of isophthalic acid and terephthalic acid which comprises neutralizing the acids with a tertiary amine boiling below about 570° F., forming a concentrated aqueous solution of the salts thus obtained, crystallizing a fraction of the dissolved salts from the solution by cooling, separating the salt fraction crystallized from the solution, heating said fraction to decompose the salts to their corresponding acids and amine, and recovering the tertiary amine and acids as decomposition products.

5. A process for separating mixtures of isophthalic acid and terephthalic acid which comprises neutralizing the acids with a tertiary amine boiling below about 570° F., forming a concentrated aqueous solution of the salts thus obtained, crystallizing a fraction of the dissolved salts from the solution by concentration of the solution through evaporation, separating the salt fraction crystallized from the solution, heating said fraction to decompose the salts to their corresponding acids and amine, and recovering the tertiary amine and acids as decomposition products.

6. A process for separating mixtures of isophthalic acid and terephthalic acid which comprises neutralizing the acids with a tertiary amine boiling below about 570° F., forming a concentrated aqueous solution of the salts thus obtained, crystallizing a fraction of the dissolved salts from the solution by cooling and concentration of the solution through evaporation, separating the salt fraction crystallized from the solution, heating said fraction to decompose the salts to their corresponding acids and amine, and recovering the tertiary amine and acids as decomposition products.

7. A process as described in claim 3, wherein the tertiary amine is pyridine.

8. A process as described in claim 3, wherein the tertiary amine is trimethylamine.

9. The process as described in claim 3, wherein the tertiary amine is dimethylaniline.

10. The process as described in claim 3, wherein the tertiary amine is N-methylpiperidine.

11. The process as described in claim 3, wherein the tertiary amine is triethylamine.

WILLIAM G. TOLAND, Jr.

No references cited.